(12) United States Patent
Li et al.

(10) Patent No.: US 11,095,481 B2
(45) Date of Patent: *Aug. 17, 2021

(54) CHANNEL ESTIMATION METHOD, BASE STATION, USER EQUIPMENT, AND SYSTEM

(71) Applicant: Huawei Technologies Co., Ltd., Shenzhen (CN)

(72) Inventors: Qiming Li, Shenzhen (CN); Jing Han, Beijing (CN); Anjian Li, Beijing (CN); Xizeng Dai, Beijing (CN); Yue Zhao, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,276

(22) Filed: Jan. 24, 2020

(65) Prior Publication Data

US 2020/0162288 A1 May 21, 2020

Related U.S. Application Data

(63) Continuation of application No. 15/894,379, filed on Feb. 12, 2018, now Pat. No. 10,574,485, which is a
(Continued)

(51) Int. Cl.
*H04L 25/02* (2006.01)
*H04W 76/10* (2018.01)
*H04W 88/02* (2009.01)

(52) U.S. Cl.
CPC ...... *H04L 25/0202* (2013.01); *H04L 25/0204* (2013.01); *H04W 76/10* (2018.02); *H04W 88/02* (2013.01)

(58) Field of Classification Search
CPC .......................... H04L 25/0202; H04W 76/10
See application file for complete search history.

(56) References Cited

U.S. PATENT DOCUMENTS

2008/0285664 A1* 11/2008 Wallace ................ H04L 1/0002
375/260
2010/0246528 A1  9/2010 Huang
(Continued)

FOREIGN PATENT DOCUMENTS

CN           101184075 A     5/2008
CN           101304399 A    11/2008
(Continued)

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 13)," 3GPP TS 36.101, V13.0.0. pp. 1-699, 3rd Generation Partnership Project, Valbonne, France (Jul. 2015).
(Continued)

*Primary Examiner* — Tuan H Nguyen
(74) *Attorney, Agent, or Firm* — Leydig, Voit & Mayer, Ltd.

(57) ABSTRACT

Embodiments of the present invention relate to a channel estimation method, a base station, user equipment UE, and a system. The method includes: setting up, by a base station, a connection to user equipment UE; and sending, to the UE, notification information indicating that the UE is in a radio remote scenario, where the notification information is used to instruct the UE to perform channel estimation by using a channel estimation algorithm applicable to the radio remote scenario, and the channel estimation algorithm is used to perform channel estimation on a signal that is obtained after downlink signals from multiple radio remote units RRUs are superposed. The UE can perform channel estimation by
(Continued)

using the appropriate channel estimation algorithm, to effectively improve accuracy of the channel estimation, thereby effectively improving a downlink data throughput of the UE.

18 Claims, 6 Drawing Sheets

Related U.S. Application Data continuation of application No. PCT/CN2015/086779, filed on Aug. 12, 2015.

(56) References Cited

U.S. PATENT DOCUMENTS

| | | | |
|---|---|---|---|
| 2013/0201840 A1* | 8/2013 | Sorrentino | H04L 5/0048 370/252 |
| 2014/0050159 A1 | 2/2014 | Frenne et al. | |
| 2014/0254504 A1* | 9/2014 | Bashar | H04L 5/0048 370/329 |
| 2014/0307630 A1 | 10/2014 | Nagata et al. | |
| 2015/0016369 A1 | 1/2015 | Park et al. | |
| 2015/0139022 A1 | 5/2015 | Mazzarese et al. | |
| 2015/0180625 A1 | 6/2015 | Park et al. | |
| 2015/0318954 A1 | 11/2015 | Park et al. | |
| 2016/0028448 A1 | 1/2016 | Park et al. | |

FOREIGN PATENT DOCUMENTS

| | | |
|---|---|---|
| CN | 101877687 A | 11/2010 |
| CN | 102104854 A | 6/2011 |
| CN | 102215503 A | 10/2011 |
| CN | 102324958 A | 1/2012 |
| CN | 102420795 A | 4/2012 |
| CN | 102647371 A | 8/2012 |
| CN | 102739298 A | 10/2012 |
| JP | 2015511447 A | 4/2015 |
| WO | 2013070145 A1 | 5/2013 |
| WO | 2014112780 A1 | 7/2014 |
| WO | 2015016583 A1 | 2/2015 |
| WO | 2015025613 A1 | 2/2015 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.6.0, pp. 1-449, 3rd Generation Partnership Project, Valbonne, France (Jun. 2015).

"Discussion on geographically separated antennas", 3GPP TSG-RAN WG4 Meeting #64 R4-124283,Qingdao, China, 3rd Generation Partnership Project, Valbonne, France (Aug. 13-17, 2012).

U.S. Appl. No. 15/894,379, filed Feb. 12, 2018.

"3rd Generation Partnership Project; Technical Specification Group Radio Access Network; Evolved Universal Terrestrial Radio Access (E-UTRA); Requirements for support of radio resource management (Release 13)," 3GPP TS 36.133 V13.0.0, total 1412 pages, 3rd Generation Partnership Project, Valbonne, France (Jul. 2015).

"3rd Generation Partnership Project; Technical Specification Group Radio Access Network; Evolved Universal Terrestrial Radio Access (E-UTRA); User Equipment (UE) procedures in idle mode (Release 12)," 3GPP TS 36.304 V12.5.0, total 38 pages, 3rd Generation Partnership Project, Valbonne, France (Jun. 2015).

\* cited by examiner

CHANNEL ESTIMATION METHOD, BASE STATION, USER EQUIPMENT, AND SYSTEM

CROSS-REFERENCE TO RELATED APPLICATION

This application is a continuation of U.S. patent application Ser. No. 15/894,379, filed on Feb. 12, 2018, which is a continuation of International Application No. PCT/CN2015/086779, filed on Aug. 12, 2015. All of the afore-mentioned patent applications are hereby incorporated by reference in their entireties.

TECHNICAL FIELD

The present invention relates to the field of mobile communications, and in particular, to a channel estimation method, a base station, user equipment (UE), and a system.

BACKGROUND

With development of science and technology, a user has an increasing demand for performing communication in a high speed scenario. For example, the user performs communication in a high speed train that is running. When UE performs communication in a high-speed moving state, multiple problems will occur, for example, a throughput rate is low, a handover frequently occurs, a handover failure rate is high, and a radio link failure rate is high.

In the prior art, for problems such as frequent handovers and a low throughput in high-speed railway mobile communication, a solution is to use a strip topology. That is, multiple radio remote units (Radio Remote Unit, RRU) are mounted on a baseband processing unit (Base Band Unit, BBU), and the RRUs are arranged along a railway track. For ease of description, a communication scenario in such a topology is referred to as a radio remote scenario. In the radio remote scenario, the multiple RRUs belong to a same physical cell, share a same cell identity (identity, ID), simultaneously serve UE in the cell, and transmit a same radio signal. From a perspective of a UE side, a radius of the cell is greatly enlarged, a quantity of handovers of UE in a high-speed movement process is effectively reduced, network handover signaling overheads are reduced, and a handover failure rate is lowered. In addition, because the multiple RRUs simultaneously transmit downlink signals for the UE, signal to interference plus noise ratios (SINR) of the signals received on the UE side are also improved to a large extent.

A radio remote deployment can effectively reduce the quantity of handovers, and improve the SINRs of the signals received by the UE. However, in the radio remote scenario described above, because the multiple RRUs simultaneously transmit the downlink signals for the UE, the signals received by the UE are relatively complex, and a channel estimation result is extremely unsatisfied, affecting a downlink data throughput of the UE.

SUMMARY

Embodiments of the present invention provide a channel estimation method, an apparatus, and a system, to effectively improve accuracy of channel estimation, thereby effectively improving a downlink data throughput of UE.

According to a first aspect, an information sending method is provided. The method includes:
setting up, by a base station, a connection to UE;
sending, to the UE, notification information indicating that the UE is in a radio remote scenario, where the notification information is used to instruct the UE to perform channel estimation by using a channel estimation algorithm applicable to the radio remote scenario, and the channel estimation algorithm is used to perform channel estimation on a signal that is obtained after downlink signals from multiple RRUs are superposed.

With reference to the first aspect, in a first possible implementation of the first aspect, the performing channel estimation on a signal that is obtained after downlink signals from multiple RRUs are superposed includes:
determining a delay and a Doppler shift of a downlink signal from each of the multiple RRUs;
performing delay and frequency compensation on the downlink signal of each RRU according to the delay and the Doppler shift; and
determining a Wiener coefficient for a compensated signal, and performing channel estimation by using the Wiener coefficient.

With reference to the first aspect or the first possible implementation of the first aspect, in a second possible implementation of the first aspect, the sending, to the UE, notification information indicating that the UE is in a radio remote scenario includes:
sending a radio resource control (RRC) dedicated signaling to the UE, where a first indicator bit in the RRC dedicated signaling is used to indicate that the UE is in the radio remote scenario; or
sending a system message to the UE, where a second indicator bit in the system message is used to indicate that the UE is in the radio remote scenario; or sending a system message to the UE, where the system message carries a cell identity of a radio remote coverage cell.

With reference to the first aspect or the first or the second possible implementation of the first aspect, in a third possible implementation of the first aspect, before the sending, to the UE, notification information indicating that the UE is in a radio remote scenario, the method further includes:
determining that the UE is in a high-speed moving state.

According to a second aspect, a channel estimation method is provided. The method includes:
receiving, by UE, notification information, where the notification information indicates that the UE is in a radio remote scenario; and
performing, according to the notification information, channel estimation by using a channel estimation algorithm applicable to the radio remote scenario, where the channel estimation algorithm is used to perform channel estimation on a signal that is obtained after downlink signals from multiple RRUs are superposed.

With reference to the second aspect, in a first possible implementation of the second aspect, the performing channel estimation on a signal that is obtained after downlink signals from multiple RRUs are superposed includes:
determining a delay and a Doppler shift of a downlink signal from each of the multiple RRUs;
performing delay and frequency compensation on the downlink signal of each RRU according to the delay and the Doppler shift; and
determining a Wiener coefficient for a compensated signal, and performing channel estimation by using the Wiener coefficient.

With reference to the second aspect or the first possible implementation of the second aspect, in a second possible implementation of the second aspect, the receiving, by UE, notification information, where the notification information indicates that the UE is in a radio remote scenario includes:

receiving, by the UE, RRC dedicated signaling, where a first indicator bit in the RRC dedicated signaling is used to indicate that the UE is in the radio remote scenario; or receiving, by the UE, a system message, where a second indicator bit in the system message is used to indicate that the UE is in the radio remote scenario; or receiving, by the UE, a system message, where the system message carries a cell identity of a radio remote coverage cell.

According to a third aspect, a base station is provided. The base station includes:

a processing unit, configured to control a sending unit to set up a connection to UE; and the sending unit, further configured to send, to the UE, notification information indicating that the UE is in a radio remote scenario, where the notification information is used to instruct the UE to perform channel estimation by using a channel estimation algorithm applicable to the radio remote scenario, and the channel estimation algorithm is used to perform channel estimation on a signal that is obtained after downlink signals from multiple RRUs are superposed.

With reference to the third aspect, in a first possible implementation of the third aspect, the performing, indicated by the sending unit, channel estimation on a signal that is obtained after downlink signals from multiple RRUs are superposed includes:

determining a delay and a Doppler shift of a downlink signal from each of the multiple RRUs;

performing delay and frequency compensation on the downlink signal of each RRU according to the delay and the Doppler shift; and determining a Wiener coefficient for a compensated signal, and performing channel estimation by using the Wiener coefficient.

With reference to the third aspect or the first possible implementation of the third aspect, in a second possible implementation of the third aspect, the sending unit is specifically configured to: send RRC dedicated signaling to the UE, where a first indicator bit in the RRC dedicated signaling is used to indicate that the UE is in the radio remote scenario; or send a system message to the UE, where a second indicator bit in the system message is used to indicate that the UE is in the radio remote scenario; or send a system message to the UE, where the system message carries a cell identity of a radio remote coverage cell.

With reference to the third aspect or the first or the second possible implementation of the third aspect, in a third possible implementation of the third aspect, the processing unit is further configured to: before the sending unit sends, to the UE, the notification information indicating that the UE is in the radio remote scenario, determine that the UE is in a high-speed moving state.

According to a fourth aspect, UE is provided. The UE includes:

a receiving unit, configured to receive notification information, where the notification information indicates that the UE is in a radio remote scenario; and a processing unit, configured to perform, according to the notification information received by the receiving unit, channel estimation by using a channel estimation algorithm applicable to the radio remote scenario, where the channel estimation algorithm is used to perform channel estimation on a signal that is obtained after downlink signals from multiple RRUs are superposed.

With reference to the fourth aspect, in a first possible implementation of the fourth aspect, the processing unit is specifically configured to: determine a delay and a Doppler shift of a downlink signal from each of the multiple RRUs; perform delay and frequency compensation on the downlink signal of each RRU according to the delay and the Doppler shift; and determine a Wiener coefficient for a compensated signal, and perform channel estimation by using the Wiener coefficient.

With reference to the fourth aspect or the first possible implementation of the fourth aspect, in a second possible implementation of the fourth aspect, the receiving unit is specifically configured to: receive RRC dedicated signaling, where a first indicator bit in the RRC dedicated signaling is used to indicate that the UE is in the radio remote scenario; or receive a system message, where a second indicator bit in the system message is used to indicate that the UE is in the radio remote scenario; or receive a system message, where the system message carries a cell identity of a radio remote coverage cell.

According to a fifth aspect, a base station is provided. The base station includes:

a communications interface;

a memory; and a processor, where the memory is configured to store a program instruction; and the processor is configured to perform, according to the program instruction stored in the memory, the following operations:

enabling the base station to set up a connection to UE by using the communications interface; and sending, to the UE by using the communications interface, notification information indicating that the UE is in a radio remote scenario, where the notification information is used to instruct the UE to perform channel estimation by using a channel estimation algorithm applicable to the radio remote scenario, and the channel estimation algorithm is used to perform channel estimation on a signal that is obtained after downlink signals from multiple RRUs are superposed.

With reference to the fifth aspect, in a first possible implementation of the fifth aspect, that the processor performs the operation of instructing the UE to perform channel estimation on a signal that is obtained after downlink signals from multiple RRUs are superposed includes:

determining a delay and a Doppler shift of a downlink signal from each of the multiple RRUs;

performing delay and frequency compensation on the downlink signal of each RRU according to the delay and the Doppler shift; and determining a Wiener coefficient for a compensated signal, and performing channel estimation by using the Wiener coefficient.

With reference to the fifth aspect or the first possible implementation of the fifth aspect, in a second possible implementation of the fifth aspect, that the processor performs the operation of sending, to the UE by using the communications interface, notification information indicating that the UE is in a radio remote scenario includes:

sending RRC dedicated signaling to the UE by using the communications interface, where a first indicator bit in the RRC dedicated signaling is used to indicate that the UE is in the radio remote scenario; or sending a system message to the UE by using the communications interface, where a second indicator bit in the system message is used to indicate that the UE is in the radio remote scenario; or sending a system message to the UE by using the communications interface, where the system message carries a cell identity of a radio remote coverage cell.

With reference to the fifth aspect or the first or the second possible implementation of the fifth aspect, in a third possible implementation of the fifth aspect, the processor is further configured to perform, according to the program instruction stored in the memory, the following operation:

before sending, to the UE by using the communications interface, the notification information indicating that the UE is in the radio remote scenario, determining that the UE is in a high-speed moving state.

According to a sixth aspect, UE is provided. The UE includes:
a communications interface;
a memory; and
a processor, where
the memory is configured to store a program instruction; and
the processor is configured to perform, according to the program instruction stored in the memory, the following operations:

receiving notification information by using the communications interface, where the notification information indicates that the UE is in a radio remote scenario; and performing, according to the notification information, channel estimation by using a channel estimation algorithm applicable to the radio remote scenario, where the channel estimation algorithm is used to perform channel estimation on a signal that is obtained after downlink signals from multiple RRUs are superposed.

With reference to the sixth aspect, in a first possible implementation of the sixth aspect, that the processor performs the operation of performing channel estimation on a signal that is obtained after downlink signals from multiple RRUs are superposed includes:

determining a delay and a Doppler shift of a downlink signal from each of the multiple RRUs;

performing delay and frequency compensation on the downlink signal of each RRU according to the delay and the Doppler shift; and determining a Wiener coefficient for a compensated signal, and performing channel estimation by using the Wiener coefficient.

With reference to the sixth aspect or the first possible implementation of the sixth aspect, in a second possible implementation of the sixth aspect, that the processor performs the operation of receiving notification information by using the communications interface, where the notification information indicates that the UE is in a radio remote scenario, includes:

receiving RRC dedicated signaling by using the communications interface, where a first indicator bit in the RRC dedicated signaling is used to indicate that the UE is in the radio remote scenario; or receiving a system message by using the communications interface, where a second indicator bit in the system message is used to indicate that the UE is in the radio remote scenario; or receiving a system message by using the communications interface, where the system message carries a cell identity of a radio remote coverage cell.

According to a seventh aspect, a communications system is provided. The system includes:

a base station, configured to: set up a connection to UE; and send, to the UE, notification information indicating that the UE is in a radio remote scenario, where the notification information is used to instruct the UE to perform channel estimation by using a channel estimation algorithm applicable to the radio remote scenario, and the channel estimation algorithm is used to perform channel estimation on a signal that is obtained after downlink signals from multiple RRUs are superposed; and the UE, configured to: receive the notification information from the base station, where the notification information indicates that the UE is in the radio remote scenario; and perform channel estimation according to the notification information by using the channel estimation algorithm applicable to the radio remote scenario, where the channel estimation algorithm is used to perform channel estimation on the signal that is obtained after the downlink signals from the multiple RRUs are superposed.

With reference to the seventh aspect, in a first possible implementation of the seventh aspect, the UE is specifically configured to: determine a delay and a Doppler shift of a downlink signal from each of the multiple RRUs; perform delay and frequency compensation on the downlink signal of each RRU according to the delay and the Doppler shift; and determine a Wiener coefficient for a compensated signal, and perform channel estimation by using the Wiener coefficient.

With reference to the seventh aspect or the first possible implementation of the seventh aspect, in a second possible implementation of the seventh aspect, the base station is specifically configured to: send RRC dedicated signaling to the UE, where a first indicator bit in the RRC dedicated signaling is used to indicate that the UE is in the radio remote scenario; or send a system message to the UE, where a second indicator bit in the system message is used to indicate that the UE is in the radio remote scenario; or send a system message to the UE, where the system message carries a cell identity of a radio remote coverage cell.

With reference to the seventh aspect or the first or the second possible implementation of the seventh aspect, in a third possible implementation of the seventh aspect, the base station is further configured to: before sending, to the UE, the notification information indicating that the UE is in the radio remote scenario, determine that the UE is in a high-speed moving state.

In the embodiments of the present invention, because the base station sends, to the UE, the notification information indicating that the UE is in the radio remote scenario, the UE can change an adopted channel estimation algorithm after receiving the notification information. For a characteristic that in the radio remote scenario, the UE receives the downlink signals that are transmitted by the multiple RRUs to the UE, during channel estimation, the appropriate channel estimation algorithm is used to perform channel estimation on the signal that is obtained after the multiple downlink signals are superposed, to effectively improve accuracy of the channel estimation, thereby effectively improving a downlink data throughput of the UE.

DESCRIPTION OF EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
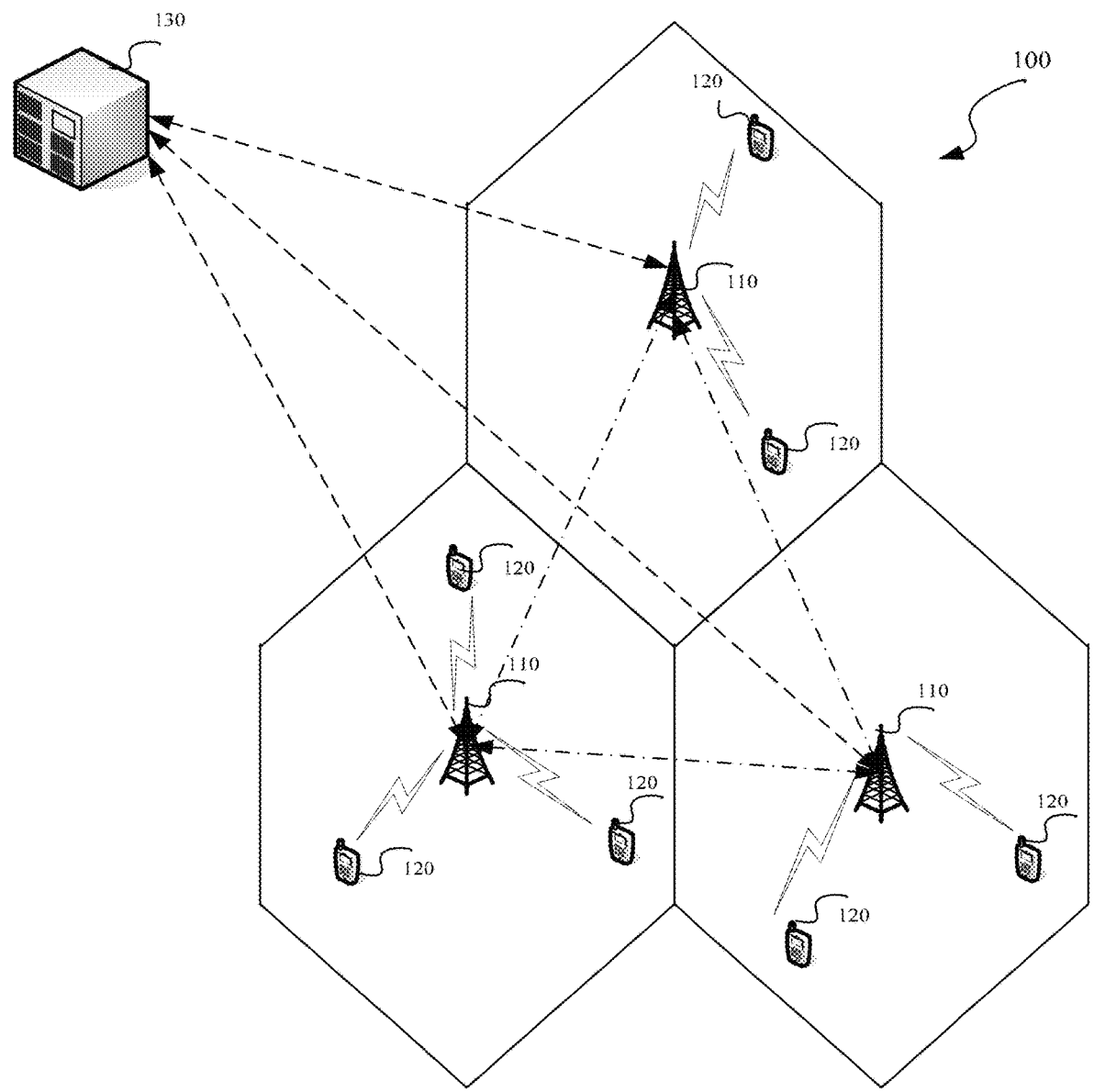
FIG. 1 is a schematic diagram of a network architecture according to an embodiment of the present invention.

FIG. 1 is a schematic diagram of a network architecture according to an embodiment of the present invention. This embodiment of the present invention may be applied to a third-generation (3rd-Generation, 3G) mobile communications technology network, or may be applied to a Long Term Evolution (Long Term Evolution, LTE) network. For ease of description, the LTE network is used below as an example for description. In an evolved universal terrestrial radio access network (Evolved-Universal Terrestrial Radio Access Network, E-UTRAN) communications system 100 of the LTE network, referring to FIG. 1, the E-UTRAN communications system 100 includes several base stations 110 and other network entities, to support several UEs 120 to perform communication. Some of the UEs 120 are located in a high speed train (High Speed Train, HST) that is running at a high speed. These UEs 120 may use a method provided in the embodiments of the present invention to demodulate downlink data received from the base stations 110.

The base station 110 may be an evolved NodeB (evolved NodeB, eNB) in LTE. One base station 110 may support/manage one or more cells. When needing to communicate with a network, the UE 120 selects one cell and initiates access.

The UE 120 may alternatively be referred to as a mobile terminal (Mobile Terminal, MT), a mobile station (Mobile Station, MS), or the like, and may perform communication with one or more core networks by using a radio access network (Radio Access Network, RAN).

A core network device 130 is connected to one or more base stations 110, and the core network device 130 includes a mobility management entity (Mobility Management Entity, MME).

This embodiment of the present invention may be applied to different communications systems. Corresponding to different communications systems, a specific base station device differs, and may be specifically a base station controller (Base Station Controller, BSC), a radio network controller (RNC), an evolved NodeB (eNB), or a NodeB (NodeB).

This embodiment of the present invention may be applied to a high speed scenario in which multiple nodes perform co-transmission, and high-speed railway mobile communication in a radio remote scenario is merely used below as an example for description.

Figure 2:
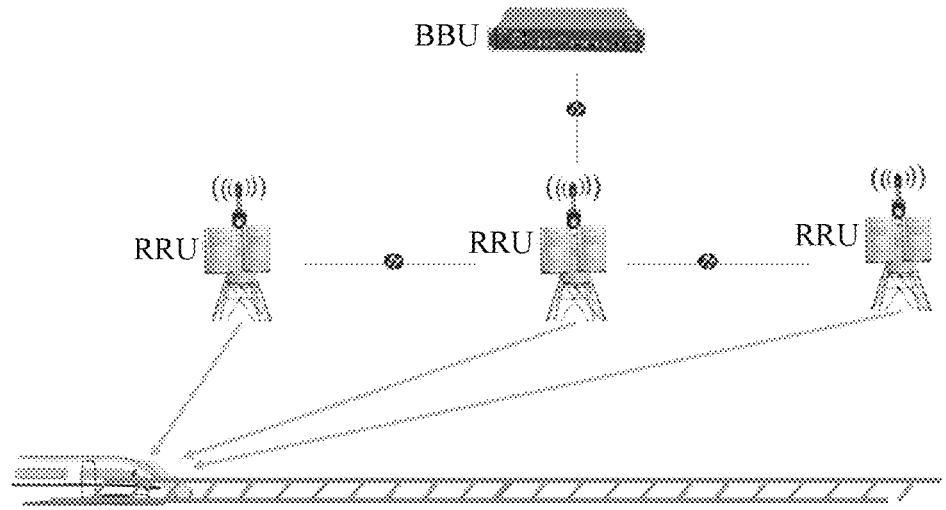
FIG. 2 is a schematic diagram of an application scenario according to an embodiment of the present invention.

FIG. 2 is a schematic diagram of an application scenario according to an embodiment of the present invention. The scenario is a radio remote scenario, and a strip topology is used in the radio remote scenario. Multiple RRUs are mounted on a BBU, and the RRUs are arranged along a railway track. The multiple RRUs are at least two RRUs, and a quantity of the RRUs may be set as needed. A quantity of the RRUs shown in this figure is 4. The quantity is merely an example for description, and is not intended to limit this embodiment of the present invention. The BBU in the radio remote scenario is equivalent to a baseband unit of a base station, and the RRU is equivalent to a radio frequency unit of the base station. In the radio remote scenario, the multiple RRUs belong to a same physical cell, share a same cell ID, simultaneously serve UE in the cell, and transmit a same radio signal. From a perspective of a UE side, a radius of the cell is greatly enlarged, a quantity of handovers of UE in a high-speed movement process is effectively reduced, network handover signaling overheads are reduced, and a handover failure rate is lowered. In addition, because the multiple RRUs simultaneously transmit downlink signals for the UE, SINRs of the signals received on the UE side are also improved to a large extent.

A radio remote deployment can effectively reduce the handovers, and improve the SINRs of the signals received by the UE. However, because an effect achieved by a conventional channel estimation algorithm is relatively poor in the radio remote scenario, downlink signal demodulation performance is poor, and a throughput rate is low.

Generally, UE has an automatic time-frequency tracking function. In a conventional macro network low-speed scenario, the UE can maintain desirable tracking performance for a received signal, and can accurately perform channel estimation. However, in a radio remote scenario of a high-speed railway dedicated network, a signal received by the UE is relatively complex. Assuming that the UE is simultaneously served by two RRUs, there are two main paths in signal received by the UE. Powers, relative delays, and Doppler shifts of the two main paths change over time, and signs of the Doppler shifts are opposite. In this case, a result of conventional channel estimation is inaccurate, affecting a downlink throughput of a terminal.

In the radio remote scenario of the high-speed railway dedicated network, the signal received by the UE is obtained by superposing downlink signals from the multiple RRUs, and downlink arrival signals from the RRUs have different powers, relative delays, and Doppler shifts. For characteristics of the downlink signals received by the UE in this scenario, a channel estimation algorithm specifically applicable to this scenario is used in this embodiment of the present invention for channel estimation, to improve accuracy of the channel estimation in this scenario, thereby improving a throughput of the UE.

Figure 3:
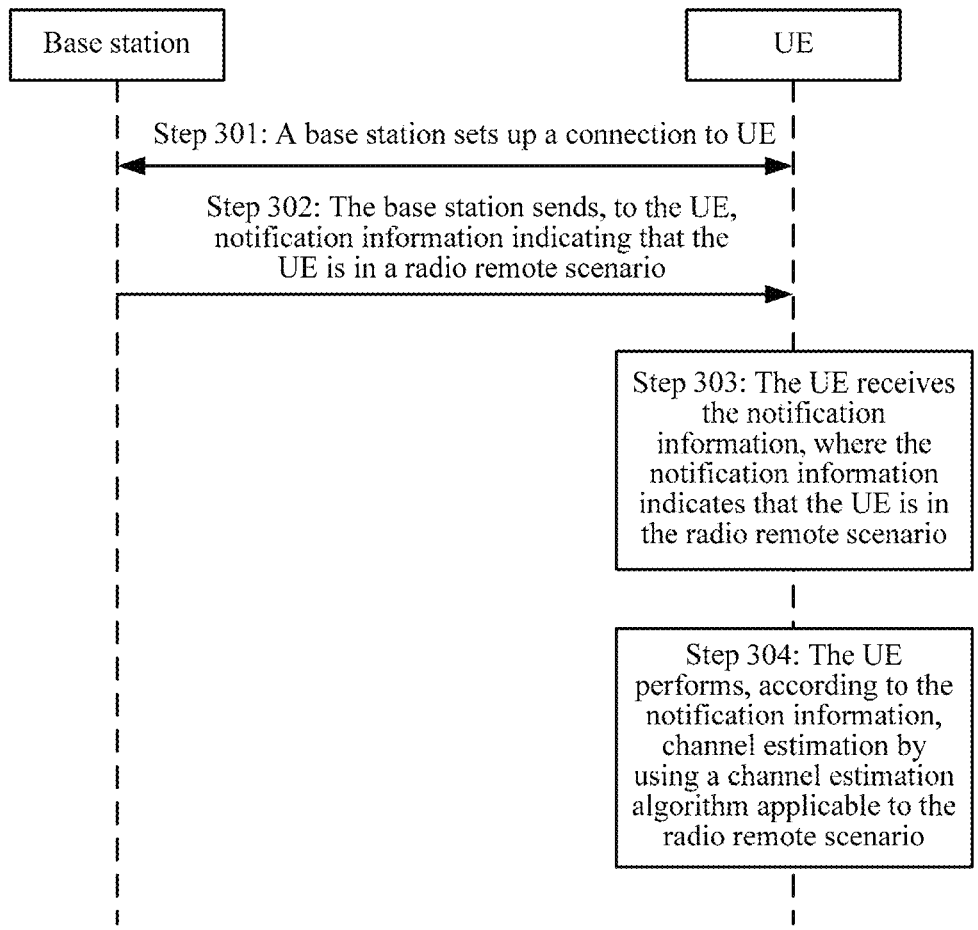
FIG. 3 is a signal flow diagram according to Embodiment 1 of the present invention.

FIG. 3 is a signal flow diagram according to Embodiment 1 of the present invention. A base station sends, to UE, notification information indicating that the UE is in a radio remote scenario, and the UE may change a channel estimation algorithm after receiving the notification information. Referring to FIG. 3, the method includes the following steps.

Step 301: A base station sets up a connection to UE.

The base station is a base station using a radio remote deployment. After the UE sets up the connection to the base station, the UE is in a radio remote scenario. A process in which the base station sets up the connection to the UE may include, but is not limited to, the following three cases: the UE in an idle state sets up the connection to the base station by means of a cell selection and a cell reselection; the UE in a connected state sets up the connection to the base station by means of a handover; and the UE sets up the connection to the base station by means of radio resource control (RRC) reconstruction.

Step 302: The base station sends, to the UE, notification information indicating that the UE is in a radio remote scenario.

The notification information is used to instruct the UE to perform channel estimation by using a channel estimation algorithm applicable to the radio remote scenario. The channel estimation algorithm is used to perform channel estimation on a signal that is obtained after downlink signals from multiple RRUs are superposed.

In this embodiment of the present invention, the base station may add the notification information to RRC dedicated signaling and send the RRC dedicated signaling to the UE, or may add the notification information to a system message and send the system message to the UE.

Because the channel estimation is more likely to be inaccurate when the UE is in a high-speed moving state, the base station may first determine whether the UE is in the high-speed moving state. When determining that the UE is in the high-speed moving state, the base station sends, to the UE, the notification information indicating that the UE is in the radio remote scenario; otherwise, the base station does not send the notification information. When a moving speed of the UE exceeds a preset speed threshold, the UE may be considered to be in the high-speed moving state. For example, the speed threshold may be set to 200 km/h. The step of determining whether the UE is in the high-speed moving state is an optional step.

Step 303: The UE receives the notification information, where the notification information indicates that the UE is in the radio remote scenario.

Specifically, the UE receives the RCC dedicated signaling, and a first indicator bit in the RRC dedicated signaling is used to indicate that the UE is in the radio remote scenario. Alternatively, the UE receives the system message, and a second indicator bit in the system message is used to indicate that the UE is in the radio remote scenario.

Step 304: The UE performs, according to the notification information, channel estimation by using a channel estimation algorithm applicable to the radio remote scenario.

The channel estimation algorithm is used to perform channel estimation on the signal that is obtained after the downlink signals from the multiple RRUs are superposed. Specifically, a delay and a Doppler shift of a downlink signal from each RRU are determined, a Wiener (Wiener) coefficient is determined according to the delay and the Doppler shift, and channel estimation is performed by using the Wiener coefficient.

In this embodiment of the present invention, because the base station sends, to the UE, the notification information indicating that the UE is in the radio remote scenario, the UE can change an adopted channel estimation algorithm after receiving the notification information. For a characteristic that in the radio remote scenario, the UE receives the downlink signals that are transmitted by the multiple RRUs to the UE, during channel estimation, channel estimation is performed on the signal that is obtained after the multiple downlink signals are superposed, to effectively improve accuracy of the channel estimation, thereby effectively improving a downlink data throughput of the UE.

Figure 4:
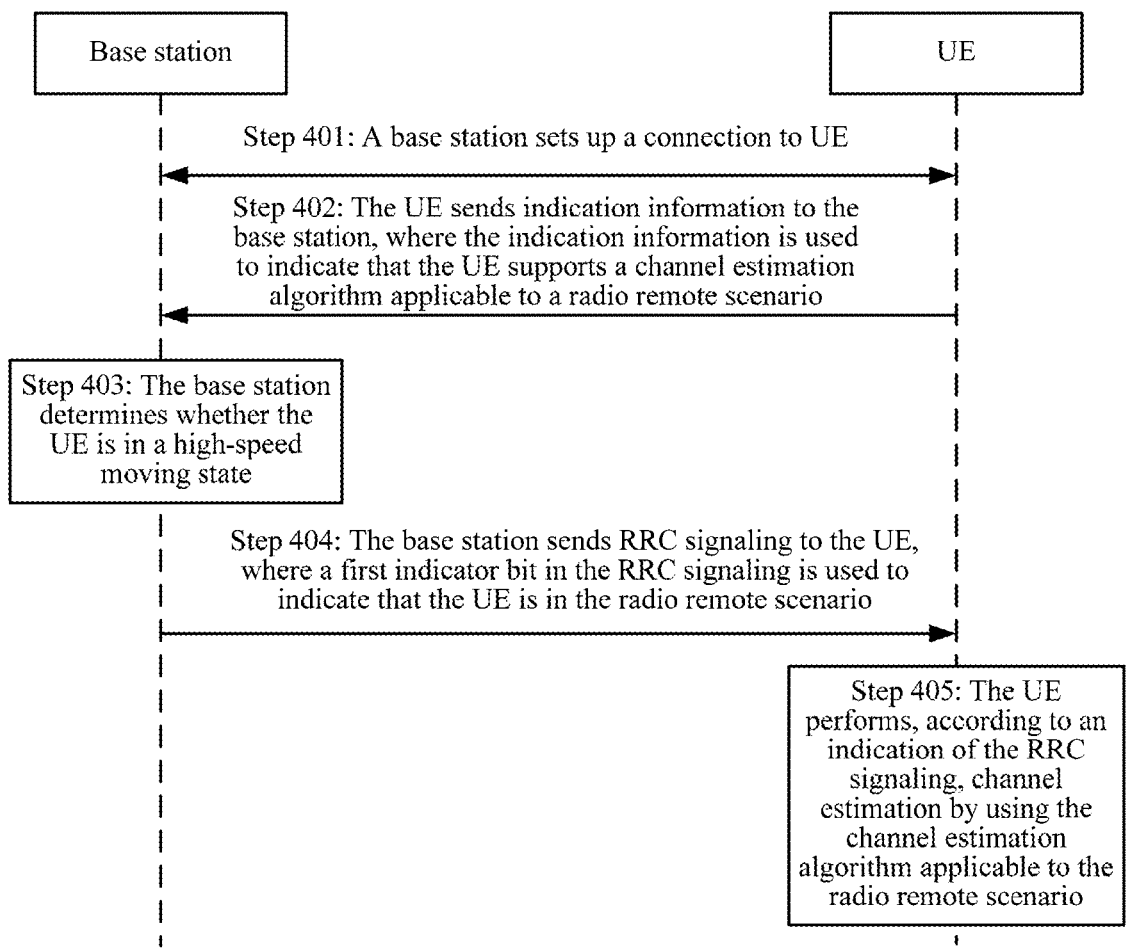
FIG. 4 is a signal flow diagram according to Embodiment 2 of the present invention.

FIG. 4 is a signal flow diagram according to Embodiment 2 of the present invention. A base station sends, to UE by using RRC dedicated signaling, notification information indicating that the UE is in a radio remote scenario. Referring to FIG. 4, the method includes the following steps.

Step 401: A base station sets up a connection to UE.

Step 402: The UE sends indication information to the base station, where the indication information is used to indicate that the UE supports a channel estimation algorithm applicable to a radio remote scenario.

Step 403: The base station determines whether the UE is in a high-speed moving state.

When a determining result is that the UE is in the high-speed moving state, step 404 is performed; otherwise, no processing is performed.

The base station may first obtain a moving speed of the UE, then determine, according to a preset speed threshold, whether the moving speed of the UE is greater than the speed threshold, and when the moving speed of the UE is greater than the speed threshold, determine that the UE is in the high-speed moving state.

In this embodiment of the present invention, alternatively, the base station may determine, by using any one of the following manners, whether the UE is in the high-speed moving state.

A first manner: The UE reports a movement status to the base station. For example, when accessing the base station, UE that supports movement status reporting adds a message element (Information Element, IE) of a movement status of the UE to signaling sent to the base station, and the base station may read a speed range of the UE from the signaling, and the signaling may be specifically an RRC connection setup complete message.

A second manner: The base station obtains a quantity of handovers of the UE in a preset time period, and allocates a speed range to the UE according to a quantity of handovers per unit time of the UE. For example, when the UE performs five or more handovers in one minute, the speed range is defined as a high speed.

A third manner: The base station determines a speed range of the UE according to a Doppler shift (Doppler shift) of a received uplink signal of the UE. For example, a Doppler shift of 1000 Hz or above indicates a high speed.

A fourth manner: The base station obtains location information of the UE by means of network side positioning, and speed information of the UE may be obtained according to location changes of the UE, so as to allocate a speed range to the UE. For example, when a speed of the UE reaches 200 km/h or above, the speed range is a high speed.

A fifth manner: The base station obtains speed data information of the UE from an application layer that includes speed information.

Step 403 is an optional step. In this embodiment of the present invention, step 403 may not be included, and step 404 is directly performed after step 402 is performed.

Step 404: The base station sends RRC dedicated signaling to the UE, where a first indicator bit in the RRC dedicated signaling is used to indicate that the UE is in the radio remote scenario.

Specifically, whether the UE is in the radio remote scenario may be indicated by using a Boolean variable. For example, 0 represents that the UE is not in the radio remote scenario, and 1 represents that the UE is in the radio remote scenario.

Step 405: The UE performs, according to an indication of the RRC dedicated signaling, channel estimation by using the channel estimation algorithm applicable to the radio remote scenario.

The channel estimation algorithm is used to perform time-frequency tracking on a downlink signal from each of multiple RRUs, to determine a delay and a Doppler shift of the downlink signal from each RRU, determine a Wiener (Wiener) coefficient according to the delay and the Doppler shift, and perform channel estimation by using the Wiener coefficient.

After entering the radio remote scenario, the UE enables the channel estimation algorithm applicable to the foregoing scenario by receiving the indication in the RRC dedicated signaling, to improve accuracy of the channel estimation of the UE in the foregoing scenario, thereby improving a downlink throughput of the UE, and improving network performance.

Figure 5:
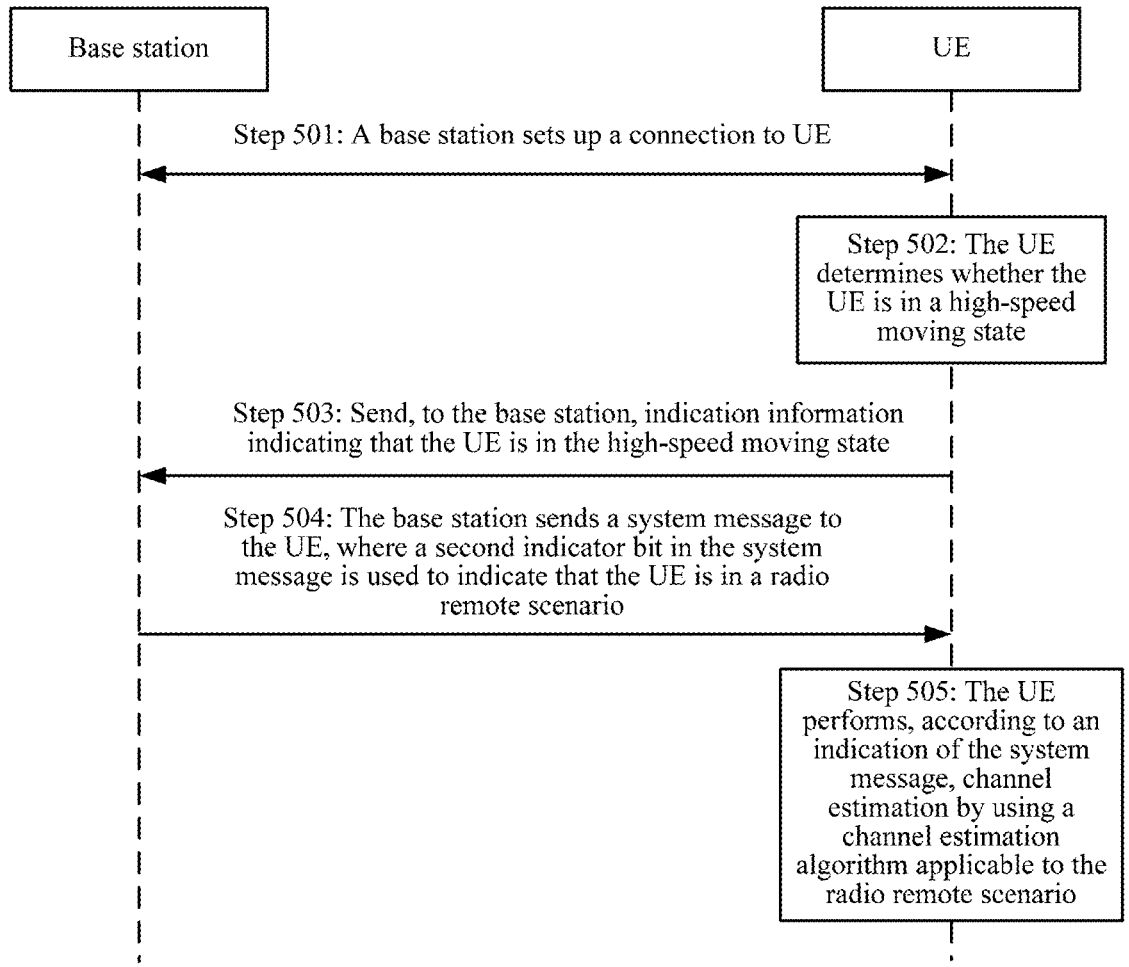
FIG. 5 is a signal flow diagram according to Embodiment 3 of the present invention.

FIG. 5 is a signal flow diagram according to Embodiment 3 of the present invention. A base station sends, to UE by using a system message, notification information indicating that the UE is in a radio remote scenario. Referring to FIG. 5, the method includes the following steps.

Step 501: A base station sets up a connection to UE.

Step 502: The UE determines whether the UE is in a high-speed moving state.

In this embodiment of the present invention, the UE may determine, by using a manner that includes, but is not limited to, the following manners, whether the UE is in the high-speed moving state.

A first manner: Test a speed by using a global positioning system (GPS) of the UE. If the speed is 300 km/h or above, it is considered as a high speed.

A second manner: Use a quantity of handovers occurring per unit time. If the quantity of handovers is five or more per minute, it is considered that a speed is high.

A third manner: Use a quantity of cell reselections occurring per unit time. If the quantity of cell reselections is five or more per minute, it is considered that a speed is high.

A fourth manner: Perform determining according to a historical cell duration period. If an average duration period in previous several cells is less than 10 seconds, it is considered that a speed is high.

Step 503: When determining that the UE is in the high-speed moving state, the UE sends, to the base station, indication information indicating that the UE is in the high-speed moving state.

In addition, indication information indicating that the UE supports a channel estimation algorithm applicable to a radio remote scenario may further be sent.

Step 504: The base station sends a system message to the UE, where a second indicator bit in the system message is used to indicate that the UE is in a radio remote scenario.

Step 505: The UE performs, according to an indication of the system message, channel estimation by using a channel estimation algorithm applicable to the radio remote scenario.

The channel estimation algorithm is used to determine a delay and a Doppler shift of a downlink signal from each of multiple RRUs, perform delay and frequency compensation on the downlink signal of each RRU according to the delay and the Doppler shift, determine a Wiener (Wiener) coefficient for a compensated signal, and perform channel estimation by using the Wiener coefficient.

After accessing the radio remote scenario, the UE enables the channel estimation algorithm applicable to the foregoing scenario by reading the indication in the system message, to improve accuracy of the channel estimation of the UE in the foregoing scenario, thereby improving a downlink throughput of the UE, and improving network performance.

In addition, for the radio remote scenario, the base station may alternatively implicitly indicate that the UE is in the radio remote scenario. For example, the system message may carry indication information indicating that a cell is a radio remote coverage cell. If determining that the UE belongs to a radio remote coverage cell, the UE enables the channel estimation algorithm applicable to the radio remote scenario.

The channel estimation algorithm that is applicable to the radio remote scenario and that is used in this embodiment of the present invention is briefly described below by using an example in which the UE is simultaneously served by two RRUs that share a same cell ID.

The channel estimation algorithm includes four main steps: delay estimation, Doppler estimation, delay and frequency compensation, and channel estimation. In each of these steps, an appropriate method needs to be selected for processing in the radio remote scenario.

Step 1: Perform delay estimation. Inverse fast Fourier transform (IFFT) is performed on a signal to obtain a first-arrival path peak value position of each main path, so that delays $\tau_1$ and $\tau_2$ of two main paths may be obtained.

Step 2: Perform Doppler estimation. The Doppler estimation is Doppler shift estimation. The Doppler estimation used in a conventional channel estimation algorithm is obtained based on calculation of a signal phase deflection of neighboring pilot symbols. A signal phase difference of pilot signal positions of neighboring common reference signals (CRS) on a same subcarrier is divided by a time interval to obtain a Doppler shift. However, in the radio remote scenario, because there are the downlink signals from the multiple RRUs, the Doppler shift of each signal is different, and a dominant signal changes over time as a power of each signal changes. Consequently, the Doppler shift cannot be accurately estimated by using the conventional Doppler estimation method. In this embodiment of the present invention, a method for estimating, from noise, Doppler shifts of multiple harmonic waves is used, for example, a non-linear LS estimation method.

Shifts of the signals from the multiple RRUs may be estimated by using a method such as a non-linear LS method, or a higher order Yule-Walker equation. An example in which the UE is simultaneously served by two RRUs is used herein, to calculate Doppler shifts of two paths by using the non-linear LS method.

A time domain cross-correlation function of a received signal is:

$$\tilde{R}_{LS}(x, l \mid k, k + \Delta k) = E\{[H_{LS}(k, x) + n][H_{LS}(k + \Delta k, l) + n']^*\} =$$

$$E[H_{LS}(k, x)H_{LS}(k + \Delta k, l)^*] + E\{n[H_{LS}(k + \Delta k, l) + n']^*\} +$$

$$E\{[H_{LS}(k, x) + n]n'^*\} + E(nn'^*) = E[H_{LS}(k, x)H_{LS}(k + \Delta k, l)^*] =$$

$$E\left\{\left[A_0(k)e^{j\frac{2\pi}{N}F_{d,0}x} + A_1(k)e^{j\frac{2\pi}{N}F_{d,1}x}\right]\left[A_0^*(k + \Delta k)e^{-j\frac{2\pi}{N}F_{d,0}l} + A_1^*(k + \Delta k)e^{-j\frac{2\pi}{N}F_{d,1}l}\right]\right\} =$$

$$E\left\{\begin{array}{l}[A_0(k)A_0^*(k + \Delta k)]e^{j\frac{2\pi}{N}F_{d,0}(x-l)} + \\ [A_1(k)A_1^*(k + \Delta k)]e^{j\frac{2\pi}{N}F_{d,1}(x-l)} + \\ A_0^*(k + \Delta k)e^{-j\frac{2\pi}{N}F_{d,0}l}A_1(k)e^{j\frac{2\pi}{N}F_{d,1}x} + \\ A_1^*(k + \Delta k)e^{-j\frac{2\pi}{N}F_{d,1}l}A_0(k)e^{j\frac{2\pi}{N}F_{d,0}x}\end{array}\right\} =$$

$$E\left\{\sum_{p=0}^{1}\frac{1}{N^2}|\tilde{\sigma}_p G(-F_{d,p})|^2 e^{j\frac{2\pi}{N}\tau_p\Delta k}e^{j\frac{2\pi}{N}F_{d,p}(x-l)} + \right.$$

-continued $$\frac{1}{N^2}\tilde{\sigma}_0^*\tilde{\sigma}_1|G(-F_{d,p})|^2$$

$$e^{j\frac{2\pi}{N}[\tau_0(k+\Delta k)-\tau_1 k]}e^{j\frac{2\pi}{N}(F_{d,1}^x-F_{d,0}^l)} + \frac{1}{N^2}$$

$$\tilde{\sigma}_1^*\tilde{\sigma}_0$$

$$|G(-F_{d,p})|^2 e^{j\frac{2\pi}{N}[\tau_1(k+\Delta k)-\tau_0 k]}e^{j\frac{2\pi}{N}(F_{d,0}^x-F_{d,1}^l)}\bigg\} =$$

$$E\bigg\{\sum_{p=0}^{1}\frac{1}{N^2}|\tilde{\sigma}_p G(-F_{d,p})|^2 e^{j\frac{2\pi}{N}\tau_p \Delta k}$$

$$e^{j2\pi f_{d,p}(x-l)T_s} +$$

$$\frac{1}{N^2}\tilde{\sigma}_0^*\tilde{\sigma}_1|G(-F_{d,p})|^2 e^{j\frac{2\pi}{N}[\tau_0(k+\Delta k)-\tau_1 k]}$$

$$e^{j\frac{2\pi}{N}(F_{d,1}^x-F_{d,0}^l)T_s} + \frac{1}{N^2}\tilde{\sigma}_1^*\tilde{\sigma}_0|G(-F_{d,p})|^2$$

$$e^{j\frac{2\pi}{N}[\tau_1(k+\Delta k)-\tau_0 k]}e^{j\frac{2\pi}{N}(F_{d,0}^x-F_{d,1}^l)T_s}\bigg\}$$

The time domain cross-correlation function may be simplified as:

$$\tilde{R}_{LS}(x,l\,|\,k,k+\Delta k) = E\{[H_{LS}(k,x)+n][H_{LS}(k+\Delta k,l)+n']^*\} =$$

$$E\bigg\{\sum_{p=0}^{1}\frac{1}{N^2}|\tilde{\sigma}_p G(-F_{d,p})|^2 e^{j\frac{2\pi}{N}\tau_p \Delta k}e^{j2\pi f_{d,p}(x-l)T_s} +$$

$$\frac{1}{N^2}\tilde{\sigma}_0^*\tilde{\sigma}_1|G(-F_{d,p})|^2 e^{j\frac{2\pi}{N}[\tau_0(k+\Delta k)-\tau_1 k]}e^{j\frac{2\pi}{N}(f_{d,1}^x-f_{d,0}^l)T_s} +$$

$$\frac{1}{N^2}\tilde{\sigma}_1^*\tilde{\sigma}_0|G(-F_{d,p})|^2 e^{j\frac{2\pi}{N}[\tau_1(k+\Delta k)-\tau_0 k]}e^{j\frac{2\pi}{N}(f_{d,0}^x-f_{d,1}^l)T_s}\bigg\}$$

In the time domain cross-correlation function, a meaning of each parameter is as follows:

$\tilde{R}_{LS}$ (x,l|k,k+Δk): a cross-correlation function between time-frequency positions (x, 1) and (k, Δk);

E ( ): an expectation;

$H_{LS}$(k,x): LS channel estimation at a time-frequency position (k, x);

n: noise;

p=0 or 1: representing the $0^{th}$ RRU signal and the $1^{st}$ RRU signal;

N: a quantity of subcarriers that are used;

$\tilde{\sigma}_p$: a power of the $p^{th}$ RRU signal;

G ( ): FFT transform of a rectangular wave, that is, $$G(k) = \sum_{n=0}^{N-1} e^{-j\frac{2\pi k}{N}n} = \frac{1-e^{-j\frac{2\pi k}{N}N}}{1-e^{-j\frac{2\pi k}{N}}} =$$

$$\frac{1-e^{-j2\pi k}}{1-e^{-j\frac{2\pi k}{N}}} = \frac{e^{-j\pi k}(e^{j\pi k}-e^{-j\pi k})}{e^{-j\frac{\pi k}{N}}(e^{j\frac{\pi k}{N}}-e^{-j\frac{\pi k}{N}})} = e^{-j\pi k(\frac{N-1}{N})}\frac{\sin(\pi k)}{\sin(\frac{\pi k}{N})};$$

$f_{d,p}$: a Doppler shift of the $p^{th}$ RRU signal;
Fd,p=fd,p/Δf, where Δf is a subcarrier spacing;
$\tilde{\tau}_p$: a delay of the $p^{th}$ RRU signal; and
$T_s$: a time unit.

The expectation in the formula may be obtained by means of averaging in a frequency domain:

$$\tilde{R}_{LS}(x,l\,|\,k,k+\Delta k) = \sum_{p=0}^{1}\frac{1}{N^2}|\tilde{\sigma}_p G(-F_{d,p})|^2 e^{j\frac{2\pi}{N}\tau_p \Delta k}e^{j2\pi f_{d,p}(x-l)T_s} +$$

$$\frac{1}{N^2}\tilde{\sigma}_0^*\tilde{\sigma}_1|G(-F_{d,p})|^2 e^{j\frac{2\pi}{N}\tau_0 \Delta k}e^{j\frac{2\pi}{N}(f_{d,1}^x-f_{d,0}^l)T_s} \cdot \frac{1}{N}\sum_{k=0}^{N}e^{j\frac{2\pi}{N}(\tau_0-\tau_1)k} +$$

$$\frac{1}{N^2}\tilde{\sigma}_1^*\tilde{\sigma}_0|G(-F_{d,p})|^2 e^{j\frac{2\pi}{N}\tau_1 \Delta k}e^{j\frac{2\pi}{N}(f_{d,0}^x-f_{d,1}^l)T_s} \cdot \frac{1}{N}\sum_{k=0}^{N}e^{j\frac{2\pi}{N}(\tau_1-\tau_0)k}$$

When there is a large difference between the powers of the two paths, for example, the difference is 5 dB or above:

$$\tilde{R}_{LS}(x,l\,|\,k,k+\Delta k) \approx \sum_{p=0}^{1}\frac{1}{N^2}|\tilde{\sigma}_p G(-F_{d,p})|^2 e^{j\frac{2\pi}{N}\tau_p \Delta k}e^{j2\pi f_{d,p}(x-l)T_s}$$

When there is a small difference between the powers of the two paths, for example, the difference is 5 dB or below:

$$\tilde{R}_{LS}(x,l\,|\,k,k+\Delta k) \approx \sum_{p=0}^{1}\frac{1}{N^2}|\tilde{\sigma}_p G(-F_{d,p})|^2 e^{j\frac{2\pi}{N}\tau_p \Delta k}e^{j2\pi f_{d,p}(x-l)T_s} +$$

$$\frac{1}{N^2}\tilde{\sigma}_0^*\tilde{\sigma}_1|G(-F_{d,p})|^2 e^{j\frac{2\pi}{N}\tau_0 \Delta k}e^{j\frac{2\pi}{N}(f_{d,1}^x-f_{d,0}^l)T_s} +$$

$$\frac{1}{N^2}\tilde{\sigma}_1^*\tilde{\sigma}_0|G(-F_{d,p})|^2 e^{j\frac{2\pi}{N}\tau_1 \Delta k}e^{j\frac{2\pi}{N}(f_{d,0}^x-f_{d,1}^l)T_s}$$

It can be learned from the above that when the two paths are close, there are cross terms (the last two terms) that cannot be canceled in the formula. In the radio remote scenario, the two paths are close only when a train is located at a middle position between the two RRUs. In this case, the Doppler shifts of the two paths hardly change over time, the cross terms may be inhibited by means of averaging in a time domain. This is denoted as:

$\tilde{R}_{LS}(x,l|k,k+\Delta k) = \tilde{R}_{LS}(t)$, t=x−1

Therefore, an average cross-correlation function may be represented as:

$\tilde{R}_{LS,average}(t) = (1-\alpha) + \tilde{R}_{LS,average}(t-1) + \tilde{R}_{LS}(t-1)$ For simplification, the formula is denoted as:

$$\beta_p = \frac{1}{N^2}|\tilde{\sigma}_p|^2 \left|\frac{\sin\left(\frac{\pi f_{d,p}}{\Delta f}\right)}{\sin\left(\frac{\pi f_{d,p}}{N\Delta f}\right)}\right|^2 e^{j\frac{2\pi}{N}\tau_p \Delta k}$$

The following may be obtained:

$$\tilde{R}_{LS}(t) = \tilde{R}_{LS}(x-l) = \sum_{p=0}^{1}\frac{1}{N^2}|\tilde{\sigma}_p|^2 \left|\frac{\sin\left(\frac{\pi f_{d,p}}{\Delta f}\right)}{\sin\left(\frac{\pi f_{d,p}}{N\Delta f}\right)}\right|^2 e^{j\frac{2\pi}{N}\tau_p \Delta k}e^{j2\pi f_{d,p}(x-l)T_s} ==$$

$$\sum_{p=0}^{1}\beta_p e^{j2\pi f_{d,p}(x-l)T_s}$$

Further, the Doppler shifts of the two paths may be obtained by using the following formula:

$$F = \sum_{m=1}^{M} \left| \tilde{R}_{LS}(m) - \sum_{p=0}^{1} \beta_p e^{j2\pi f_{d,p} mT_s} \right|^2 \Rightarrow (f_{d,0}\ f_{d,1}) =$$

$$\arg\max[Y^H B(B^H B)^{-1} B^H Y]$$

In the formula:

$$Y = \left[ \tilde{R}_{LS}(m_1)\ \tilde{R}_{LS}(m_2)\ \tilde{R}_{LS}(m_2)\ \tilde{R}_{LS}(m_3)\ \tilde{R}_{LS}(m_4) \right]^T$$

$$B = \begin{bmatrix} e^{j2\pi f_{d,0} m_1 T_s} & e^{j2\pi f_{d,1} m_1 T_s} \\ e^{j2\pi f_{d,0} m_2 T_s} & e^{j2\pi f_{d,1} m_2 T_s} \\ e^{j2\pi f_{d,0} m_3 T_s} & e^{j2\pi f_{d,1} m_3 T_s} \\ e^{j2\pi f_{d,0} m_4 T_s} & e^{j2\pi f_{d,1} m_4 T_s} \end{bmatrix}$$

In the formula, m represents an OFDM symbol position in each subframe:

m1: #0 and #4, #7 and #11, m2: #0 and #7, #4 and #11, m3: #4 and #7, m4: #0 and #11

Step 3: Perform delay and frequency compensation. A common method may be used for the delay compensation. For the frequency compensation, in this embodiment of the present invention, the powers of the two paths need to be determined first. If there is a large difference between the powers of the two paths, for example, the difference is 5 dB or above, the frequency compensation is performed according to a strong path. If the powers of the two paths are similar, Doppler shift and delay estimation may be separately performed on the two paths. A Wiener coefficient is calculated according to estimated values. By means of adjusting a baseband center frequency of a local oscillator of the UE to a center of the Doppler shifts of the two paths, inter-carrier interference can be reduced.

Step 4: Perform channel estimation. In this embodiment of the present invention, channel estimation at a non-pilot position may be obtained based on calculation of channel estimation at a pilot position.

Specifically, the channel estimation at the non-pilot position is obtained by multiplying a Wiener coefficient matrix by the channel estimation at the pilot position.

$H_{Est} = W_{MMSE} H_{LS}$, where $H_{Est}$ represents the channel estimation at the non-pilot position, $W_{MMSE}$ represents the Wiener coefficient matrix, and $H_{LS}$ Ls represents the channel estimation at the pilot position, where the Wiener coefficient matrix is obtained based on time-domain and frequency-domain cross-correlation functions:

$$W_{MMSE} = R_{H_{LS} H_{CRS}} R_{H_{LS}}^{-1} = R_{H_{CRS}} \left( R_{H_{CRS}} + \frac{\sigma^2}{E(|x_{CRS}|^2)} I \right)^{-1}$$

$$R_{H_{CRS}} = \begin{bmatrix} R_H(0,0) & R_H(0,1) & \cdots & R_H(0,N-1) \\ R_H(1,0) & R_H(1,1) & \cdots & R_H(1,N-1) \\ \vdots & \vdots & \ddots & \vdots \\ R_H(N-1,0) & R_H(N-1,1) & \cdots & R_H(N-1,N-1) \end{bmatrix}$$

$H_{LS}$ is channel estimation of a pilot symbol, and may be obtained by means of dividing a received sequence by a local sequence. This is the same as a conventional method. WMMSE may be obtained by using one-dimensional linear filtering twice. That is, Wiener filtering is performed on a frequency first, and then filtering is performed on a time domain. A frequency domain related function is as follows:

$$R_{H,F}(k-q) = \frac{1}{N^2} \sum_{p=0}^{1} |\tilde{\sigma}_p|^2 |G(-F_{d,p})|^2 e^{-j\frac{2\pi}{N}\tau_p(k-q)} =$$

$$\sum_{p=0}^{1} \frac{1}{N^2} |\tilde{\sigma}_p|^2 \left| \frac{\sin\left(\frac{\pi f_{d,p}}{\Delta f}\right)}{\sin\left(\frac{\pi f_{d,p}}{N\Delta f}\right)} \right|^2 e^{-j\frac{2\pi}{N}\tau_p(k-q)}$$

A time domain related function is as follows:

$$\tilde{R}_{H,T}(x-l) = \sum_{p=0}^{1} \frac{1}{N^2} |\tilde{\sigma}_p G(-F_{d,p})|^2 e^{j\frac{2\pi f_{d,p}}{\Delta f}(x-l)} =$$

$$\sum_{p=0}^{1} \frac{1}{N^2} |\tilde{\sigma}_p|^2 \left| \frac{\sin\left(\frac{\pi f_{d,p}}{\Delta f}\right)}{\sin\left(\frac{\pi f_{d,p}}{N\Delta f}\right)} \right|^2 e^{j2\pi f_{d,p}(x-l)T_s}$$

Therefore, frequency filtering may be represented as:

$$W_{MMSE,F} = R_{H_{LS} H_{CRS}} R_{H_{LS}}^{-1} = R_{H,F} \left( R_{H,F} + \frac{\sigma^2}{E(|x_{CRS}|^2)} I \right)^{-1}$$

Time domain filtering may be represented as:

$$W_{MMSE,T} = R_{H_{LS} H_{CRS}} R_{H_{LS}}^{-1} = R_{H,T} \left( R_{H,T} + \frac{\sigma^2}{E(|x_{CRS}|^2)} I \right)^{-1}$$

It can be found from an experiment that the conventional channel estimation method is inaccurate, a throughput of the UE is low, and although a signal-to-noise ratio is greatly improved, there is still a bottleneck of the throughput. However, in the channel estimation algorithm provided in this embodiment of the present invention, the downlink throughput of the UE obtains an obvious gain.

Figure 6:
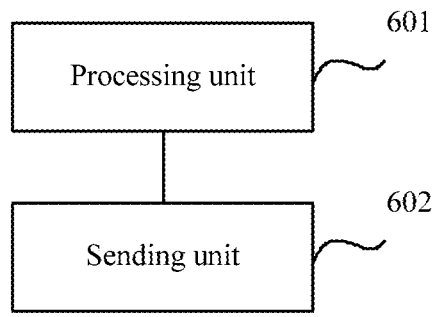
FIG. 6 is a structural diagram of a base station according to Embodiment 4 of the present invention.

FIG. 6 is a structural diagram of a base station according to Embodiment 4 of the present invention. The base station is configured to perform a channel estimation method provided in the embodiments of the present invention. The base station includes:

a processing unit 601, configured to control a sending unit 602 to set up a connection to UE; and the sending unit 602, further configured to send, to the UE, notification information indicating that the UE is in a radio remote scenario, where the notification information is used to instruct the UE to perform channel estimation by using a channel estimation algorithm applicable to the radio remote scenario, and the channel estimation algorithm is used to perform channel estimation on a signal that is obtained after downlink signals from multiple RRUs are superposed.

Optionally, the performing, indicated by the sending unit 602, channel estimation on a signal that is obtained after downlink signals from multiple RRUs are superposed includes:

determining a delay and a Doppler shift of a downlink signal from each of the multiple RRUs;

performing delay and frequency compensation on the downlink signal of each RRU according to the delay and the Doppler shift; and determining a Wiener coefficient for a compensated signal, and performing channel estimation by using the Wiener coefficient.

Optionally, the sending unit 602 is specifically configured to send RRC dedicated signaling to the UE, where a first indicator bit in the RRC dedicated signaling is used to indicate that the UE is in the radio remote scenario; or send a system message to the UE, where a second indicator bit in the system message is used to indicate that the UE is in the radio remote scenario.

Optionally, the processing unit 601 is further configured to: before the sending unit 602 sends, to the UE, the notification information indicating that the UE is in the radio remote scenario, determine that the UE is in a high-speed moving state.

Figure 7:
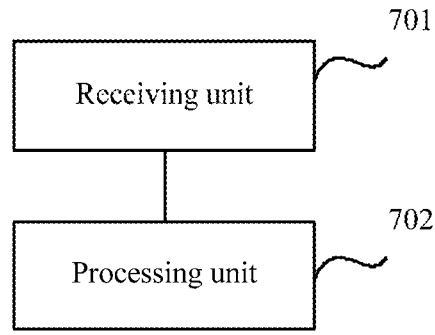
FIG. 7 is a structural diagram of UE according to Embodiment 5 of the present invention.

FIG. 7 is a structural diagram of UE according to Embodiment 5 of the present invention. The UE is configured to perform a channel estimation method provided in the embodiments of the present invention. The UE includes:

a receiving unit 701, configured to receive notification information, where the notification information indicates that the UE is in a radio remote scenario; and a processing unit 702, configured to perform, according to the notification information received by the receiving unit 701, channel estimation by using a channel estimation algorithm applicable to the radio remote scenario, where the channel estimation algorithm is used to perform channel estimation on a signal that is obtained after downlink signals from multiple RRUs are superposed.

Optionally, the processing unit 702 is specifically configured to: determine a delay and a Doppler shift of a downlink signal from each of the multiple RRUs; perform delay and frequency compensation on the downlink signal of each RRU according to the delay and the Doppler shift; and determine a Wiener coefficient for a compensated signal, and perform channel estimation by using the Wiener coefficient.

Optionally, the receiving unit 701 is specifically configured to: receive RRC dedicated signaling, where a first indicator bit in the RRC dedicated signaling is used to indicate that the UE is in the radio remote scenario; or receive a system message, where a second indicator bit in the system message is used to indicate that the UE is in the radio remote scenario.

Figure 8:
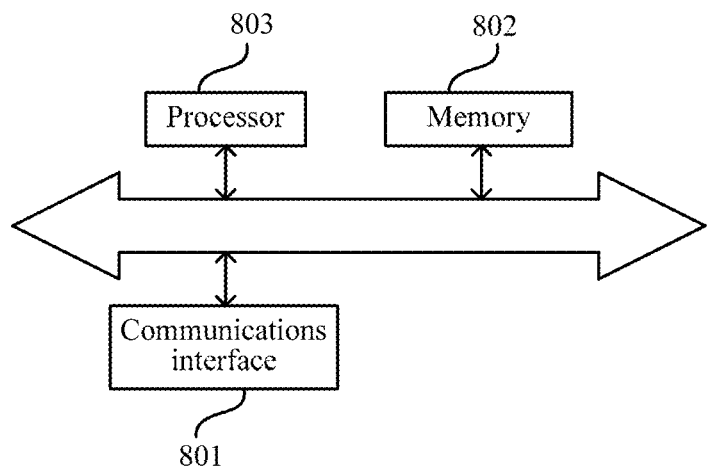
FIG. 8 is a structural diagram of a base station according to Embodiment 6 of the present invention.

FIG. 8 is a structural diagram of a base station according to Embodiment 6 of the present invention. The base station is configured to perform a channel estimation method provided in the embodiments of the present invention. The base station includes:

a communications interface 801;

a memory 802; and a processor 803, where the memory 802 is configured to store a program instruction; and the processor 803 is configured to perform, according to the program instruction stored in the memory 802, the following operations:

enabling the base station to set up a connection to UE by using the communications interface 801; and sending, to the UE by using the communications interface 801, notification information indicating that the UE is in a radio remote scenario, where the notification information is used to instruct the UE to perform channel estimation by using a channel estimation algorithm applicable to the radio remote scenario, and the channel estimation algorithm is used to perform channel estimation on a signal that is obtained after downlink signals from multiple RRUs are superposed.

Optionally, that the processor 803 performs the operation of instructing the UE to perform channel estimation on a signal that is obtained after downlink signals from multiple RRUs are superposed includes:

determining a delay and a Doppler shift of a downlink signal from each of the multiple RRUs;

performing delay and frequency compensation on the downlink signal of each RRU according to the delay and the Doppler shift; and determining a Wiener coefficient for a compensated signal, and performing channel estimation by using the Wiener coefficient.

Optionally, that the processor 803 performs the operation of sending, to the UE by using the communications interface 801, notification information indicating that the UE is in a radio remote scenario includes:

sending RRC dedicated signaling to the UE by using the communications interface 801, where a first indicator bit in the RRC dedicated signaling is used to indicate that the UE is in the radio remote scenario; or sending a system message to the UE by using the communications interface 801, where a second indicator bit in the system message is used to indicate that the UE is in the radio remote scenario.

Optionally, the processor 803 is further configured to perform, according to the program instruction stored in the memory 802, the following operation:

before sending, to the UE by using the communications interface 801, the notification information indicating that the UE is in the radio remote scenario, determining that the UE is in a high-speed moving state.

Figure 9:
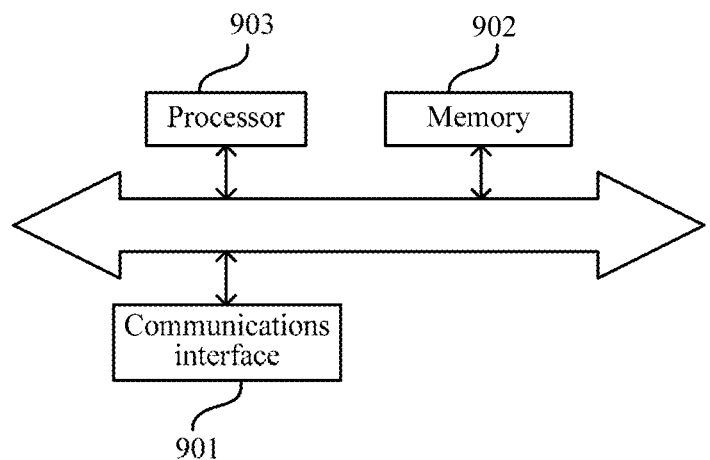
FIG. 9 is a structural diagram of UE according to Embodiment 7 of the present invention.

FIG. 9 is a structural diagram of UE according to Embodiment 7 of the present invention. The UE is configured to perform a channel estimation method provided in the embodiments of the present invention. The UE includes:

a communications interface 901;

a memory 902; and a processor 903, where the memory 902 is configured to store a program instruction; and the processor 903 is configured to perform, according to the program instruction stored in the memory 902, the following operations:

receiving notification information by using the communications interface 901, where the notification information indicates that the UE is in a radio remote scenario; and performing, according to the notification information, channel estimation by using a channel estimation algorithm applicable to the radio remote scenario, where the channel estimation algorithm is used to perform channel estimation on a signal that is obtained after downlink signals from multiple RRUs are superposed.

Optionally, that the processor 903 performs the operation of performing channel estimation on a signal that is obtained after downlink signals from multiple RRUs are superposed includes:

determining a delay and a Doppler shift of a downlink signal from each of the multiple RRUs;

performing delay and frequency compensation on the downlink signal of each RRU according to the delay and the Doppler shift; and determining a Wiener coefficient for a compensated signal, and performing channel estimation by using the Wiener coefficient.

Optionally, that the processor 903 performs the operation of receiving notification information by using the communications interface 901, where the notification information indicates that the UE is in a radio remote scenario, includes:

receiving RRC dedicated signaling by using the communications interface 901, where a first indicator bit in the RRC dedicated signaling is used to indicate that the UE is in the radio remote scenario; or receiving a system message by using the communications interface 901, where a second indicator bit in the system message is used to indicate that the UE is in the radio remote scenario.

Figure 10:
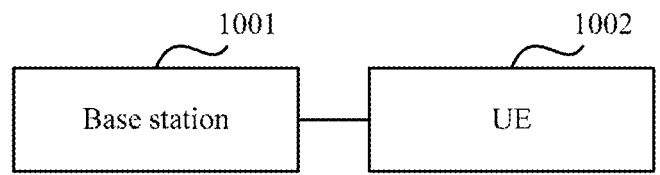
FIG. 10 is a structural diagram of a communications system according to Embodiment 8 of the present invention.

FIG. 10 is a structural diagram of a communications system according to Embodiment 8 of the present invention. The communications system is configured to perform a channel estimation method provided in the embodiments of the present invention. The system includes:

a base station 1001, configured to: set up a connection to UE 1002; and send, to the UE 1002, notification information indicating that the UE 1002 is in a radio remote scenario, where the notification information is used to instruct the UE 1002 to perform channel estimation by using a channel estimation algorithm applicable to the radio remote scenario, and the channel estimation algorithm is used to perform channel estimation on a signal that is obtained after downlink signals from multiple RRUs are superposed; and the UE 1002, configured to: receive the notification information from the base station 1001, where the notification information indicates that the UE is in the radio remote scenario; and perform channel estimation according to the notification information by using the channel estimation algorithm applicable to the radio remote scenario, where the channel estimation algorithm is used to perform channel estimation on the signal that is obtained after the downlink signals from the multiple RRUs are superposed.

Optionally, the UE 1002 is specifically configured to: determine a delay and a Doppler shift of a downlink signal from each of the multiple RRUs; perform delay and frequency compensation on the downlink signal of each RRU according to the delay and the Doppler shift; and determine a Wiener coefficient for a compensated signal, and perform channel estimation by using the Wiener coefficient.

Optionally, the base station 1001 is specifically configured to: send RRC dedicated signaling to the UE 1002, where a first indicator bit in the RRC dedicated signaling is used to indicate that the UE 1002 is in the radio remote scenario; or send a system message to the UE 1002, where a second indicator bit in the system message is used to indicate that the UE is in the radio remote scenario.

Optionally, the base station 1001 is further configured to: before sending, to the UE 1002, the notification information indicating that the UE 1002 is in the radio remote scenario, determine that the UE 1002 is in a high-speed moving state.

A person skilled in the art may be further aware that, in combination with the examples described in the embodiments disclosed in this specification, units and algorithm steps may be implemented by electronic hardware, computer software, or a combination thereof. To clearly describe interchangeability between hardware and software, the foregoing has generally described compositions and steps of each example according to functions. Whether the functions are performed by the hardware or the software depends on particular applications and design constraint conditions of the technical solutions. A person skilled in the art may use different methods to implement the described functions for each particular application, but it should not be considered that the implementation goes beyond the scope of the present invention.

It may be understood by a person of ordinary skill in the art that all or a part of the steps in the foregoing method of the embodiments may be implemented by a program instructing a processor. The program may be stored in a computer readable storage medium. The storage medium may be a non-transitory (English: non-transitory) medium, such as a random access memory, a read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely specific example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A system message sending method for a base station, wherein the method comprises:
    setting up a connection to user equipment(UE);
    sending, to the UE, the system message indicating that the UE is to perform a channel estimation by using a channel estimation algorithm applicable to a radio remote scenario in which signs of Doppler shifts of signals received by the UE from two radio remote units (RRUs) of multiple RRUs are opposite, and wherein the multiple RRUs share a same cell identity;
    sending, by the multiple RRUs, signal to the UE.

2. The method according to claim 1, wherein the method further comprises:
    determining that the UE is in a high-speed moving state.

3. The method according to claim 1, wherein the multiple RRUs belong to a same physical cell; and
    sending, by multiple RRUs, signal to the UE, comprises:
    sending, by multiple RRUs, same signal to the UE.

4. A channel estimation method for user equipment (UE), wherein the method comprises:
    receiving a system message, wherein the system message indicates that the UE is to perform a channel estimation by using a channel estimation algorithm applicable to a radio remote scenario in which signs of Doppler shifts of signals received by the UE from two radio remote units (RRUs) of multiple RRUs are opposite, and wherein the multiple RRUs share a same cell identity;
    receiving signal from the multiple RRUs.

5. The method according to claim 4, wherein the performing channel estimation comprises:
    determining a delay and a Doppler shift of a downlink signal from each of the multiple RRUs;
    performing delay and frequency compensation on the downlink signal of each RRU according to the delay and the Doppler shift; and
    determining a Wiener coefficient for a compensated signal, and performing channel estimation by using the Wiener coefficient.

6. The method according to claim 4, wherein the multiple RRUs belong to a same physical cell.

7. A base station, wherein the base station comprises:
a processor, configured to control a communications interface to set up a connection to user equipment UE, wherein the communications interface comprises multiple radio remote units (RRUs);
the communications interface, further configured to send, to the (UE), a system message indicating that the UE is to perform a channel estimation by using a channel estimation algorithm applicable to a radio remote scenario in which signs of Doppler shifts of signals received by the UE from two radio remote units (RRUs) of multiple RRUs are opposite, and wherein the multiple RRUs share a same cell identity; and
send signal to the UE.

8. The base station according to claim 7, wherein the processor is further configured to: determine that the UE is in a high-speed moving state.

9. The base station according to claim 7, wherein the multiple RRUs belong to a same physical cell; and
the communications interface configured to:
send, by the multiple RRUs, same signal to the UE.

10. A communications apparatus, wherein the communications apparatus comprises:
a communications interface, configured to receive a system message, wherein the system message indicates that the communications apparatus is to perform a channel estimation by using a channel estimation algorithm applicable to a radio remote scenario in which signs of Doppler shifts of signals received by the UE from two radio remote units (RRUs) of multiple RRUs are opposite, and wherein the multiple RRUs share a same cell identity;
the communications interface, configured to receive signal from the multiple RRUs.

11. The communications apparatus according to claim 10, wherein the processor is configured to: determine a delay and a Doppler shift of a downlink signal from each of the multiple RRUs; perform delay and frequency compensation on the downlink signal of each RRU according to the delay and the Doppler shift; and determine a Wiener coefficient for a compensated signal, and perform channel estimation by using the Wiener coefficient.

12. The communications apparatus according to claim 10, wherein the multiple RRUs belong to a same physical cell.

13. A non-transitory computer readable medium, comprising computer program instructions which when executed by one or more processors cause a base station to execute the steps of:

setting up a connection to user equipment(UE);
sending, to the UE, a system message indicating that the UE is to perform a channel estimation by using a channel estimation algorithm applicable to a radio remote scenario in which signs of Doppler shifts of signals received by the UE from two radio remote units (RRUs) of multiple RRUs are opposite, and wherein the multiple RRUs share a same cell identity;
sending, by the multiple RRUs, signal to the UE.

14. The non-transitory computer readable medium according to claim 13, wherein the program instructions cause the base station to determine that the UE is in a high-speed moving state.

15. The non-transitory computer readable medium according to claim 13, wherein the multiple RRUs belong to a same physical cell; and
the program instructions cause the base station to execute the steps of:
sending, by the multiple RRUs, same signal to the UE.

16. A non-transitory computer readable medium, comprising computer program instructions which when executed by one or more processors cause user equipment to execute the steps of:
receiving a system message, wherein the system message indicates that the UE is to perform a channel estimation by using a channel estimation algorithm applicable to a radio remote scenario in which signs of Doppler shifts of signals received by the UE from two radio remote units (RRUs) of multiple RRUs are opposite, and wherein the multiple RRUs share a same cell identity;
receiving signal from the multiple RRUs.

17. The non-transitory computer readable medium according to claim 16, wherein the program instructions cause the base station to execute the steps of:
determining a delay and a Doppler shift of a downlink signal from each of the multiple RRUs;
performing delay and frequency compensation on the downlink signal of each RRU according to the delay and the Doppler shift; and
determining a Wiener coefficient for a compensated signal, and performing channel estimation by using the Wiener coefficient.

18. The non-transitory computer readable medium according to claim 16, wherein the multiple RRUs belong to a same physical cell.

* * * * *